United States Patent [19]

Kawazoe

[11] 4,240,129
[45] Dec. 16, 1980

[54] HOLDING DEVICE FOR ATTACHING A DEVICE SUCH AS A CAMERA BRACKET

[76] Inventor: Michio Kawazoe, 30-11 5 chome, Higashi, Narita Suginami ku, Tokyo, Japan

[21] Appl. No.: 935,474

[22] Filed: Aug. 21, 1978

[30] Foreign Application Priority Data

Oct. 31, 1977 [JP] Japan .......................... 52-147020[U]

[51] Int. Cl.$^2$ ............................................ G03B 15/02
[52] U.S. Cl. .................................... 362/3; 248/221.3; 248/222.1; 248/222.4
[58] Field of Search ............... 248/221.3, 221.1, 222.4; 362/3

[56] References Cited

U.S. PATENT DOCUMENTS

| | | | |
|---|---|---|---|
| 1,246,749 | 11/1917 | Joiner | 248/221.3 |
| 1,625,163 | 4/1927 | Schurr | 248/221.3 |
| 2,719,469 | 10/1955 | Sanford | 362/3 X |
| 2,834,567 | 5/1958 | Young | 248/221.3 X |
| 2,839,668 | 6/1958 | Mills | 362/3 X |
| 3,850,398 | 11/1974 | Kantor | 248/222.1 |
| 3,999,055 | 12/1976 | Wakahara | 362/3 X |
| 4,029,038 | 6/1977 | Pfahl | 248/221.3 X |

Primary Examiner—William H. Schultz
Attorney, Agent, or Firm—Donald D. Mon

[57] ABSTRACT

A holding device for attaching a strobe grip to a camera bracket which comprises a first retainer with an insertion hole in the center, a lock lever, a locking slit, a clamp lever, and a second retainer with a central through-hole, arranged in the order described. The lock lever is controlled lengthwise by a locking spring and axially by a compression spring which presses on the side of the clamp lever. Opposed faces on the clamp lever and the second retainer have the shape of an inclined cam so that the clamp lever can be moved against the compression spring toward the strobe grip when turning the clamp lever in tightening direction. The second retainer is engaged by a jack so as to hold the jack, which has a convex rubber member in engagement with an annular rubber member on the second retainer. The camera bracket is provided with a pin having a head in the center for engagement with the locking slit. The pin cooperates with the lock lever whose axial position is controlled by the compression spring and the clamp lever to engage or disengage the jack from the second retainer.

8 Claims, 3 Drawing Figures

HOLDING DEVICE FOR ATTACHING A DEVICE SUCH AS A CAMERA BRACKET

BACKGROUND OF THE INVENTION

This invention relates to a holding device for attaching a Strobe (an electronic flash) to a camera bracket and more particularly concerns a holding device for attaching a Strobe to a camera bracket which is used when photographing is done with a Strobe turned relative to the camera, that is a holding device for attaching a Strobe to a camera bracket, which is effectively used for photographing with bounce light.

BRIEF SUMMARY OF THE INVENTION

It is an object of the invention to provide a holding device for attaching a Strobe to a camera bracket by which the camera can be turned relatively to the Strobe continuously and stepless, and furthermore permits a camera to be set in a desired situation.

Figure 1:
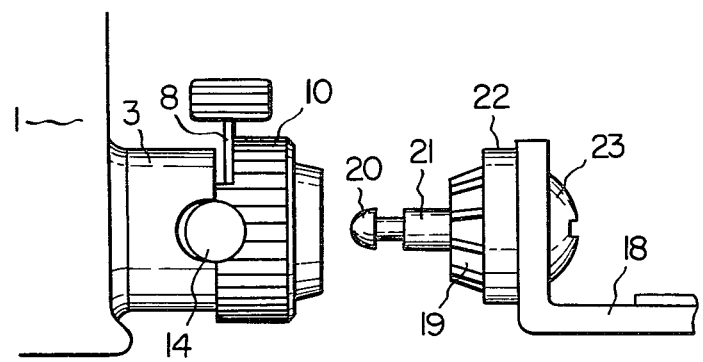
FIG. 1 shows a front view of a holding device according to the invention, the holding device being shown divided into two separated parts, one of which is attached to a strobe grip and the other to a bracket for supporting a camera.
Figure 2:
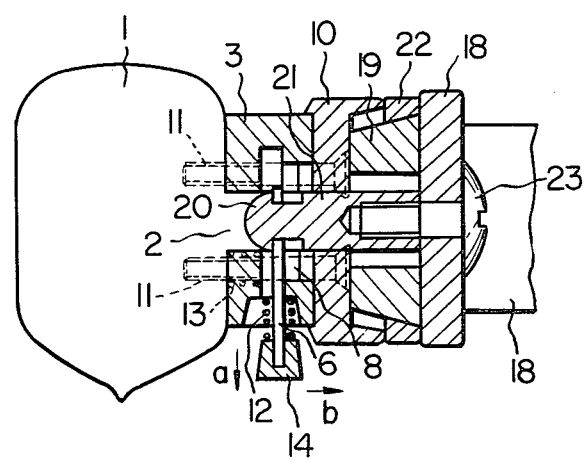
FIG. 2 is a cross section view of the holding device of FIG. 1, wherein the two parts shown separated in FIG. 1 are connected together.
Figure 3:
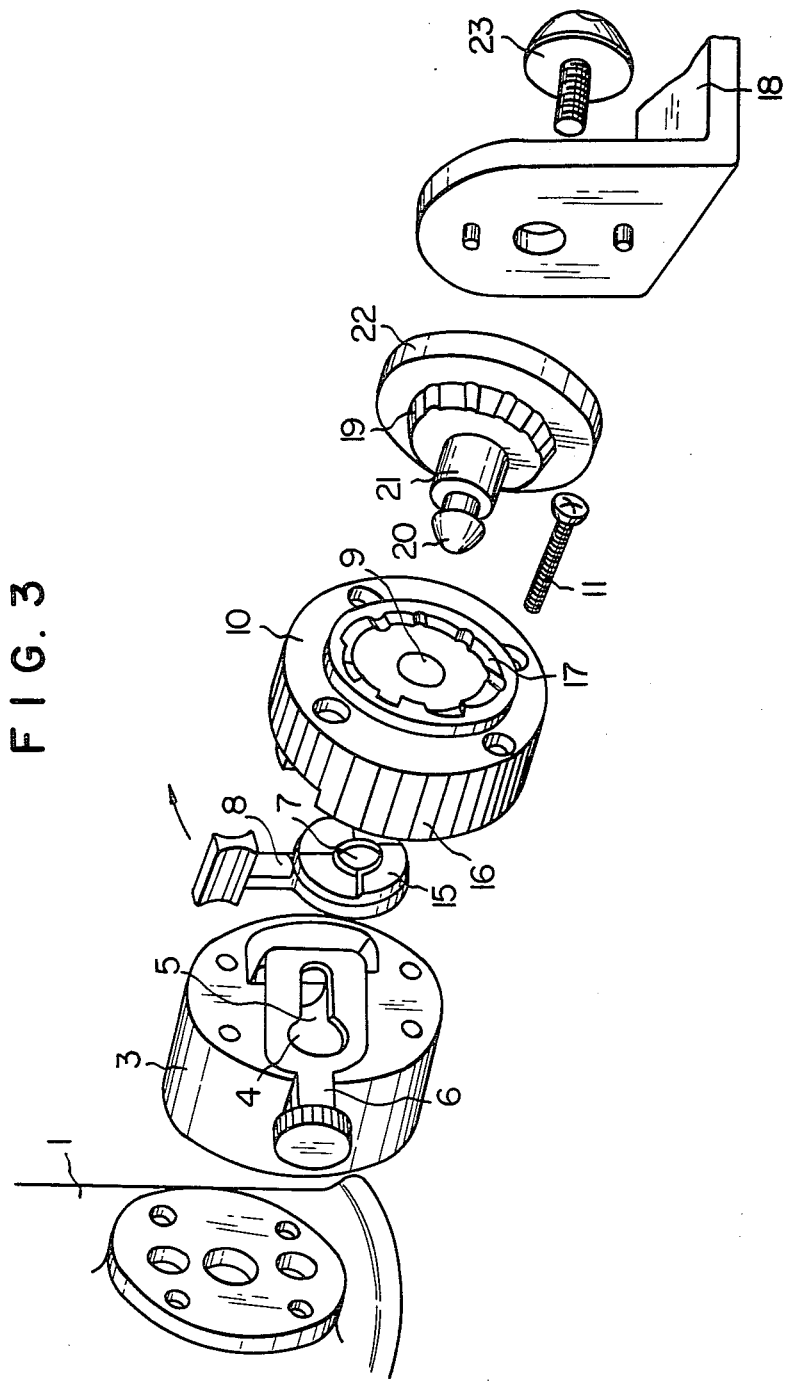
FIG. 3 is an exploded view of the holding device of FIGS. 1 and 2, including the strobe grip and camera bracket.

Referring first to the embodiment of the invention shown in FIGS. 1 through 3 the holding device for attaching a Strobe to a camera bracket comprises a first retainer 3 with a hole 2 in the center, a lock lever 6 having a release hole 4 and a locking slit 5 which communicates with the release hole, a clamp lever 8 having a central hole 7, and a second retainer 10 having a central through hole 9. The first retainer 3, the lock lever 6, the clamp lever 8 and the second retainer 10 are arranged in this order on an axis passing through holes 9, 7 and 2 and into the side of the strobe grip 1, and the first retainer, the clamp lever, and the second retainer are secured to the Strobe grip 1 with four screws 11. The lock lever 6 is controlled lengthwise, that is, in the direction transverse to said axis, by a locking spring 12 which reacts against a force pushing the lock lever 6 in the opposite lengthwise direction during the release operation, and the lock lever is controlled in the axial direction by a compression spring 13 which presses against plate 13a and lock lever 6 on part of the side of clamp lever 8. The locking spring 12 is interposed between a push button 14 for performing the release operation and the first retainer 3. The compression spring 13 is interposed between the grip 1 and the lock lever 6.

The faces of the clamp lever 8 and of the second retainer 10 which are placed against each other have the shape of such an inclined cam that the clamp lever 8 can be moved in the direction opposite that of arrow b (FIG. 2) against the force of the compression spring 13 toward the Strobe grip when turning the clamp lever 8 on the axis in the tightening direction. The other face of the second retainer 10 is provided with an annular rubber member 17 which is made of rubber such as raw rubber, neoprene, evertate, or the like. This other face of the second retainer 10 is engaged with a jack 22 so as to hold the jack 22. The jack 22 is provided with a convex rubber member 19 which is made of rubber such as raw rubber, neoprene, evertate, or the like, and which is engaged with the annular rubber member 17 so as to prevent the annular rubber member from rotating. The jack is also provided with a pin 21 having a central head 20, coaxial with the axis, and protruding through holes 9 and 7 and the slit 5 to engage with the locking slit 5. The bracket 18 is attached to the jack 22 with a screw 23.

As the construction of the holding device according to the invention is as above-mentioned, by pushing fully the lock lever 6 against the locking spring 12, the release hole 4 can be aligned with the hole 2 of the first retainer 3, the hole 7 of the clamp lever 8, and the hole 9 of the second retainer 10. Under that condition, if the pin 21 of the jack 22 is inserted into the hole 9 of the second retainer 10, and then pushing pressure on the lock lever 6 is discontinued, the lock lever 6 will be moved in the direction which is shown by the arrow "a" in FIG. 2, by the locking spring 12, and the head 20 of the pin 21 can be engaged with slit 5. Consequently the side part of the bracket 18 can be connected with the side part of the Strobe grip, and the former cannot be separated from the latter without aligning the head 20 and the release hole 4 by again pushing the lock lever 6. In such a condition that the head 20 is engaged with slit 5, the lock lever 6 is urged by the compression spring 13 toward the side of the clamp lever 8, and consequently the jack 22 with the axis 21 whose head 20 is engaged with the slit 5, and the bracket 18 which is attached to the jack 22 are urged in the direction of the arrow "b" in FIG. 2. Therefore, the part of the holding device attached to the side of the bracket 18 can be rotated relative to the part of the holding device attached to the side of the Strobe grip. Accordingly when the direction of the camera is changed continuously stepless and freely, photographing with bounce light can be done.

Then, when the relative directions of the Strobe and camera are as desired, if the clamp lever 8 is turned in the tightening direction which is shown by the arrow in FIG. 3, the clamp lever 8 and the lock lever 6 can be moved against the compression spring 13 in the opposite direction from that of arrow "b" in FIG. 2, as the inclined cam face 15 is slid on the inclined cam face 16 of the second retainer 10, and therewith, the jack 22 with the axis 21 whose head 20 is engaged with the slit 5 of the lock lever 6. Consequently bracket 18 which is attached to the jack 22 can be also pulled in the opposite direction from that of arrow "b". And the annular rubber member 17 of the second retainer 10 is engaged with the convex rubber member 19 of the jack 22. In that case, the compression force of rubber acts on the side part of the bracket 18, and the frictional resistance peculiar to rubber damps the rotation force so that the bracket 18 is fixed. In that case, as lock lever 6 is also locked by the clamp lever 8 and the head 20 of the pin 21, the locking lever 6 can be pushed. Therefore perfect lock can be provided. In respect to changing the relative situation of a Strobe and a camera, if the clamp lever 8 is turned in the opposite direction from that of the arrow shown in FIG. 3, which is in the release direction, the bracket for attaching a Strobe to a camera becomes rotatable. Therefore, it becomes possible to set the bracket for attaching a Strobe to a camera in the desired direction, and then to tighten the clamp lever 8.

By this expedient, photographing can be done with the setting of a camera and a Strobe at the desired angle. To separate the part of the holding device attached to the side of the bracket 18 from the part of the holding device attached to the side of the grip 1, the clamp lever 5 8 is loosened, and then while the lock lever 6 is pushed fully the direction opposite that of arrow "a" (FIG. 2) the part of the holding device attached to the side of the bracket 18 is drawn back through release hole 4.

As above-mentioned, by means of the holding device according to the invention the relative direction of a camera and a Strobe can be changed continuously stepless and freely, and photographing with bounce light can be done.

What is claimed is:

1. A holding device for attaching a member such as a strobe grip to a camera bracket or the like which comprises a first retainer with an insertion hole in the center, a lock lever with a release hole and a locking slit which communicates with the release hole, a clamp lever with a central hole, and a second retainer with a central through-hole, and the first retainer, the lock lever, the clamp lever, and the second retainer, being arranged in the above order and the first retainer, the clamp lever, and the second retainer being secured to the member with screws, the lock lever being lengthwise controlled by a locking spring which reacts against a force pushing lengthwise on the lock lever in the release operation and controlled axially by a compression spring which presses a part of the side of the clamp lever, opposed faces of the clamp lever and the second retainer having the shape of such an inclined cam that the clamp lever can be moved against the compression spring toward the member when turning the clamp lever in the tightening direction, the second retainer being engaged with a jack so as to hold the jack, the jack being engaged with the second retainer and a pin with a head in the center thereof which is engageable with the locking slit, a bracket being attached to the jack with a screw.

2. A holding device for attaching a member such as a strobe grip to a bracket, comprising:
   A. a member attachment; and
   B. A bracket attachment; said member attachment comprising:
   (a) a first retainer having a first face adapted to be fixed to the member and a second face remote from the first face, said retainer having a first hole extending into it from its second face;
   (b) a lock lever comprising a plate having through it a second hole and a slit in communication with each other, the width of the slit being narrower than the diameter of said second hole, said plate being adjacent, and slidable relative to, said second face so that in a first position of the lever said second hole is aligned and in communication with said first hole, and in a second position of the lever the slit is in communication with said first hole;
   (c) a clamp lever comprising a member having a third face and a fourth face remote from said third face, said third face being adjacent said plate so that said plate is sandwiched between the first retainer and the clamp lever member, said clamp lever member having through it a third hole aligned on an axis with said first hole;
   (d) a second retainer having a fifth face opposed to, and in contact with, said fourth face and having a sixth face remote from its fifth face and having through it a fourth hole aligned with said first and third holes on said axis;
   (e) means for fastening said first and second retainers together and to said member,
      (i) said clamping lever being rotatable relative to said second retainer, and
      (ii) at least one of said fourth and fifth faces comprising cam means so that rotation of the clamp lever alters the degree of axial pressure between the clamp lever and the lock lever;
   said bracket attachment comprising:
   (a) a jack adapter to be fastened to the bracket, said jack having,
      (i) a seventh face adapted to engage said sixth face, said seventh face having:
         a pin protruding from it, adapted to extend through said second, third and fourth holes and into said first hole; and a head at the free end of said pin, of larger diameter than the diameter of the part of the pin adjacent the head, at least one of said sixth and seventh faces having means for inhibiting relative rotation between them when said sixth and seventh faces are brought into engagement with each other;
      whereby when the lock lever is in its second position while said head of the pin is within said first hole, and the clamp lever is rotated to increase the degree of pressure between the clamp lever and the lock lever, the member is secured to said bracket.

3. A holding device according to claim 2 including means between the member and the lock lever urging the lock lever to move axially in the direction away from the member.

4. A holding device according to claim 2 including means urging the lock lever toward its second position.

5. A holding device according to claim 2 in which said fourth and fifth faces both have cooperating cam means.

6. A holding device according to claim 2 in which said sixth and seventh faces both have means for inhibiting relative rotation between them.

7. A holding device according to claim 2 in which the head of the pin is too large to pass through the slit.

8. A holding device according to claim 7 in which said part of the pin adjacent the head is of smaller diameter than the adjacent part of the pin and is small enough to pass through the slit, said adjacent part of the pin being too large to pass through the slit.

* * * * *